(12) United States Patent
Reiner et al.

(10) Patent No.: US 6,407,938 B2
(45) Date of Patent: Jun. 18, 2002

(54) CIRCUIT CONFIGURATION HAVING A MULTI-STATE SWITCHING DEVICE AND AN ENERGY DISCHARGE DEVICE CONNECTED TO A TEMPORARY ENERGY STORAGE DEVICE IN A THIRD SWITCHING STATE OF THE SWITCHING DEVICE

(75) Inventors: Robert Reiner, Neubiberg; Michael Smola, München; Herbert Palm, Höhenkirchen, all of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/796,212

(22) Filed: Feb. 28, 2001

Related U.S. Application Data

(63) Continuation of application No. PCT/DE99/02717, filed on Aug. 31, 1999.

(30) Foreign Application Priority Data

Aug. 31, 1998 (DE) .......................... 198 39 643

(51) Int. Cl.⁷ ................................. H02M 3/06
(52) U.S. Cl. .......................... 363/62; 307/110
(58) Field of Search ................ 363/61, 62; 307/109, 307/110

(56) References Cited

U.S. PATENT DOCUMENTS

| | | | |
|---|---|---|---|
| 4,578,772 A | * 3/1986 | Fujii | 363/62 |
| 5,095,223 A | * 3/1992 | Thomas | 307/110 |
| 5,278,489 A | 1/1994 | Bowers | 323/225 |
| 5,581,454 A | * 12/1996 | Collins | 363/62 |

FOREIGN PATENT DOCUMENTS

| | | |
|---|---|---|
| DE | 195 06 921 C2 | 8/1996 |
| EP | 0 386 261 A1 | 9/1990 |
| EP | 0 818 875 A2 | 1/1998 |
| JP | 61 161 967 | 7/1986 |

OTHER PUBLICATIONS

Bruce D. Moore: "Reglerstrukturen für batteriebetriebene Systeme" [controller figuration for battery operated systems], Elektronik 2/94, pp. 94–100.

* cited by examiner

*Primary Examiner*—Bao Q. Vu
(74) *Attorney, Agent, or Firm*—Laurence A. Greenberg; Werner H. Stemer; Gregory L. Mayback

(57) ABSTRACT

The power supply device has a temporary energy store, a main energy store, and a switching device. The switching device has three switching states. The temporary energy store is connected in the first switching state to a power supply input and is connected in the second switching state to the main energy store, which is connected to a power supply output. An energy discharge device is connected to the temporary energy store in the third switching state of the switching device which follows directly the second switching state.

7 Claims, 2 Drawing Sheets

CIRCUIT CONFIGURATION HAVING A MULTI-STATE SWITCHING DEVICE AND AN ENERGY DISCHARGE DEVICE CONNECTED TO A TEMPORARY ENERGY STORAGE DEVICE IN A THIRD SWITCHING STATE OF THE SWITCHING DEVICE

CROSS-REFERENCE TO RELATED APPLICATION

This application is a continuation of International Application No. PCT/DE99/02717, filed Aug. 31, 1999, which designated the United States.

BACKGROUND OF THE INVENTION

Field of the Invention

The invention lies in the electronics art and pertains, more specifically, to a power supply device and to a circuit configuration having the power supply device.

Japanese patent Abstracts JP 61161967 discloses a power supply device having a temporary energy store, a main energy store and a switching device. The switching device has two switching states. In a first switching state, the temporary energy store is connected to a power supply input and in a second switching state it is connected to the main energy store. The latter is connected to a power supply output. The same applies to European published patent application EP 0 818 875 A2.

European published patent application EP 0 386 261 A1 discloses a similar configuration, with the temporary energy store being switched by means of two switching devices which alternately drive the input and output of the temporary energy store. Furthermore, a configuration for controlling a switching device in a power supply device is described in U.S. Pat. No. 5,278,489.

There exists an increasing need to provide a data processing circuit with secure power supplies. This requirement arises from the fact that there is an increasing need in data processing technology to check whether a data processing circuit may or may not be operated. Attempts are increasingly being made to circumvent such measures, which are based on identification or authentication involved in the process and checking whether operation is or is not allowed. One possibility for gaining unauthorized access to operations or data in a data processing device is the possibility of detecting changes in the power consumption of the data processing device during authorized operation. These changes can then be used to gain access to specific processes and/or data to which access is intrinsically not allowed.

SUMMARY OF THE INVENTION

The object of the present invention is to provide a power supply device, and a circuit configuration with a data processing device, which overcome the above-noted deficiencies and disadvantages of the prior art devices and methods of this general kind, and wherein it is not possible to deduce any processes or data in the data processing device by monitoring the power consumption.

With the above and other objects in view there is provided, in accordance with the invention, a power supply device, comprising:

a power supply input and a power supply output;
a switching device having a first switching state, a second switching state, and a third switching state temporally following the second switching state;
a main energy store connected to the power supply output;
a temporary energy store connected to the power supply input in the first switching state and to the main energy store in the second switching state of the switching device; and
an energy discharge device connected to the temporary energy store in the third switching state of the switching device.

In accordance with an added feature of the invention, the switching device is one of a plurality of switching devices and the temporary energy store is one of a plurality of temporary energy stores respectively associated with the switching devices and selectively connectible in parallel with one another to the power supply input and to the main energy store.

In accordance with an additional feature of the invention, the plurality of temporary energy stores are connected to the power supply input at different predetermined times.

In accordance with another feature of the invention, the plurality of temporary energy stores are simultaneously connected to the main energy store.

With the above and other objects in view there is also provided, in accordance with the invention, an integrated circuit configuration comprising a power supply device as outline above and a data processing device connected to the power supply output. The power supply and the data processor are expediently integrated on a common semiconductor chip.

In accordance with a concomitant feature of the invention, the switching device is configured to be operated at a frequency which is less than or equal to a maximum operating frequency of the data processing device.

By decoupling the charged temporary energy store from the power supply input and by changing the charge on the main energy store, the power consumption which can be observed at the power supply input is independent of the instantaneous value of the power consumption which can be observed at the power supply output or which is caused by the data processing device, since the temporary energy store is connected to an energy discharge device once the charge has been transferred to the main energy store.

Other features which are considered as characteristic for the invention are set forth in the appended claims.

Although the invention is illustrated and described herein as embodied in a power supply device, and a circuit configuration having this power supply device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
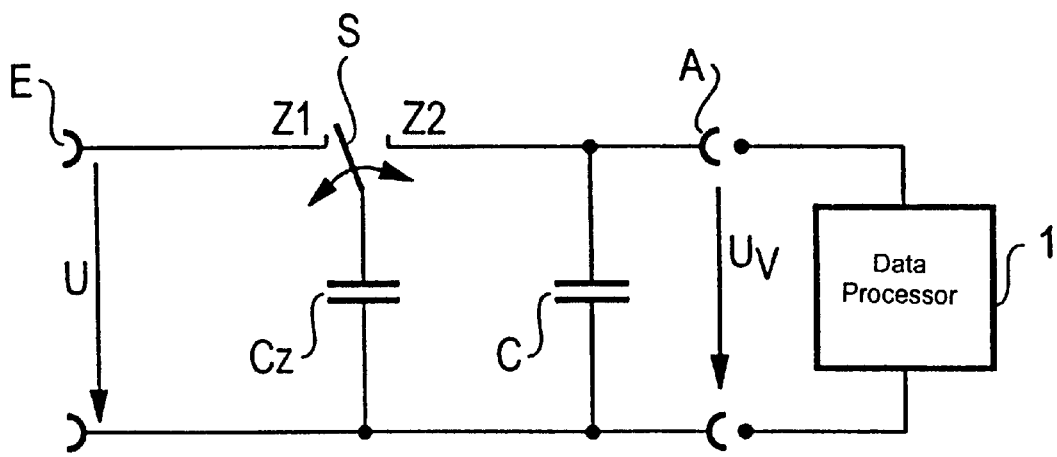
FIG. 1 is a schematic circuit diagram of a first exemplary embodiment according to the invention.

Referring now to the figures of the drawing in detail and first, particularly, to FIG. 1 thereof, there is seen a first exemplary embodiment according to the invention. In this case, the figure shows that a voltage U is applied to an input E and is supplied to a switch S when the switch S assumes a first switching state Z1. In the first switching state, the voltage is also supplied to a capacitor CZ. In the process, the capacitor CZ is charged to the value of the voltage U applied to the input E. When the switch S assumes the second state Z2, then the capacitor CZ is no longer connected to the input E, but is connected to a capacitor C which is in turn charged by the capacitor CZ. The voltage UV applied to the capacitor C is present at the output A and is used as a supply voltage for a data processing device 1, which is likewise connected to the node A. The operation of the data processing device 1 once again results in power being consumed, so that the capacitor C is discharged. The switch S must therefore be switched back to the state Z1, so that the capacitor CZ is recharged and, once the switch S has been switched back to the state Z2, recharges the capacitor C once again.

The data processing device 1 is in turn intended to be operated at clock rate T. If the switching frequency which is used in order to recharge the capacitor C repeatedly is less than twice the clock rate T, then it is not possible to use the charging current which is used to charge the capacitor CZ to deduce the current with which the data processing device 1 is being operated from the capacitor C.

A simple low-pass filter attenuates the high frequencies and thus makes it harder to deduce the function, although the actual current profile can be made visible once again by appropriate amplification.

The configuration in the form of a sampling filter now makes it possible to use a switching frequency (sampling frequency) which is less than twice the clock frequency of the circuit to deliberately contravene the sampling theorem and thus to make it considerably more difficult to reconstruct the original current profile. The desired corruption becomes greater the lower the switching frequency in comparison to the clock frequency.

Reconstruction can be made even more difficult by varying the switching frequency with time.

Figure 2:
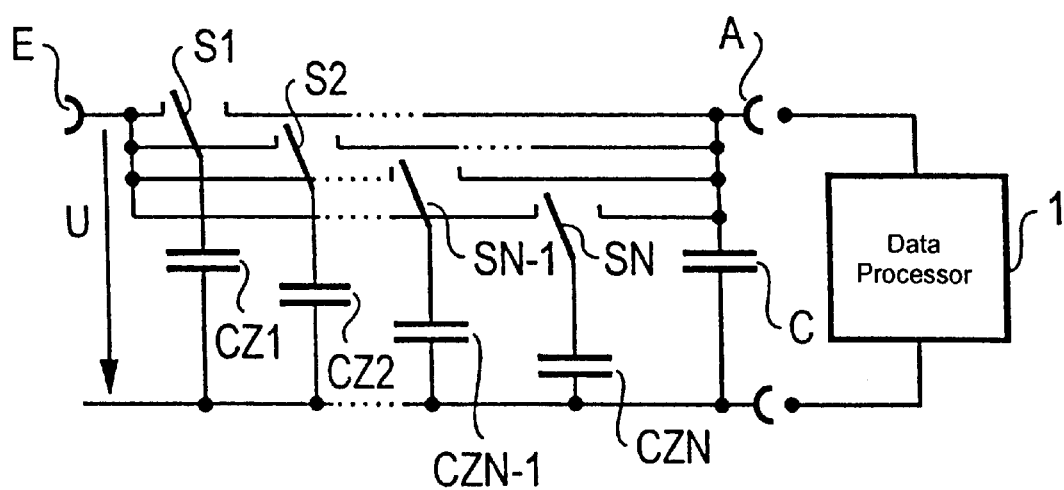
FIG. 2 is a schematic circuit diagram of a development of the exemplary embodiment illustrated in FIG. 1.

Referring now to FIG. 2, there is shown a development of the exemplary embodiment illustrated in FIG. 1. Here, identical and comparable elements are denoted by the same reference symbols. In this development, a large number, that is to say a number N, of capacitors Z1 to ZN are provided, which are charged with the voltage U from the voltage input via respective switches S1 to SN. The invention now provides either for the capacitors to be charged at the same time using the input voltage U in order after this to be connected successively in parallel to the capacitor C. This reduces the voltage ripple on the capacitor C, without any more information being transmitted to the input E. A further option is to connect the capacitors CZ1 to CZN sequentially in a complex sequence to the input E and to the capacitor C. In both cases, the charging current drawn from the input voltage is made uniform or is smooth. Furthermore, it is possible in both cases for the described arrangement to be operated as a voltage regulator for the data processing device 1. In this case, the clock switching rate T is regulated as a function of the current drawn, that is to say as a function of the supply voltage UV.

Figure 3:
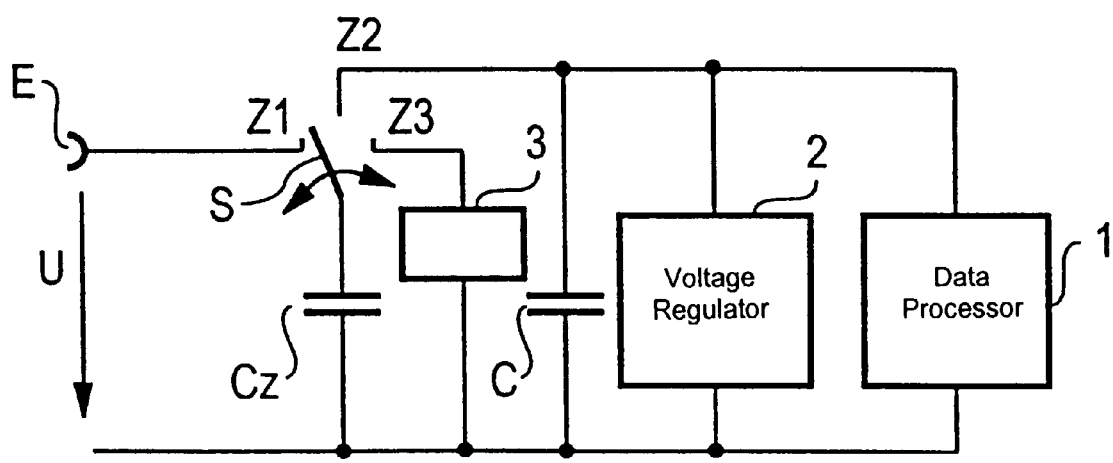
FIG. 3 is a schematic circuit diagram of a further refinement of the exemplary embodiment of the invention illustrated in FIG. 1.

Referring now to FIG. 3, there is shown a further development of the exemplary embodiment illustrated in FIG. 1. Here, the switch S has a third state Z3. Furthermore, a parallel voltage regulator 2 is provided in parallel with the capacitor C and the data processing device 1. The difference in operation, as is shown in FIG. 3, to the arrangement illustrated in FIG. 1 is that, once the charge stored on the capacitor CZ has been moved to the capacitor C, the switch S assumes the state Z3. In this position, the capacitor is connected in parallel with a discharge circuit 3. This discharge circuit 3 at that point discharges the capacitor CZ to a predetermined value. The switch S then switches back to the state Z1, so that the capacitor CZ is connected to the input E, so that it is once again charged from the input voltage U. In this way, the capacitor CZ is in a predetermined state before being recharged, so that it is always charged with the same charging current from the input voltage U.

All three refinements of the first exemplary embodiment according to the invention are suitable for being constructed in the form of an integrated circuit on a semiconductor chip.

In this case, for example for a data processing device which requires a supply voltage of two volts and is operated with a mean power loss of 2 milliwatts and with a switching frequency of 1 MHz and an input voltage of 3 volts, a capacitance of 1 nF is required for the capacitor CZ. A current of 1 mA is transmitted in this case. The switch S in a case such as this is in the form of a conventional electronic switch. The circuit configuration is preferably for use in integrated circuits which are produced based on the technology using ferroelectric dielectrics. In a case such as this, the dielectric constant $\epsilon$ which can be used is greater than the previously used dielectric constants, so that a smaller area is required for a predetermined capacitance in a case such as this.

Figure 4:
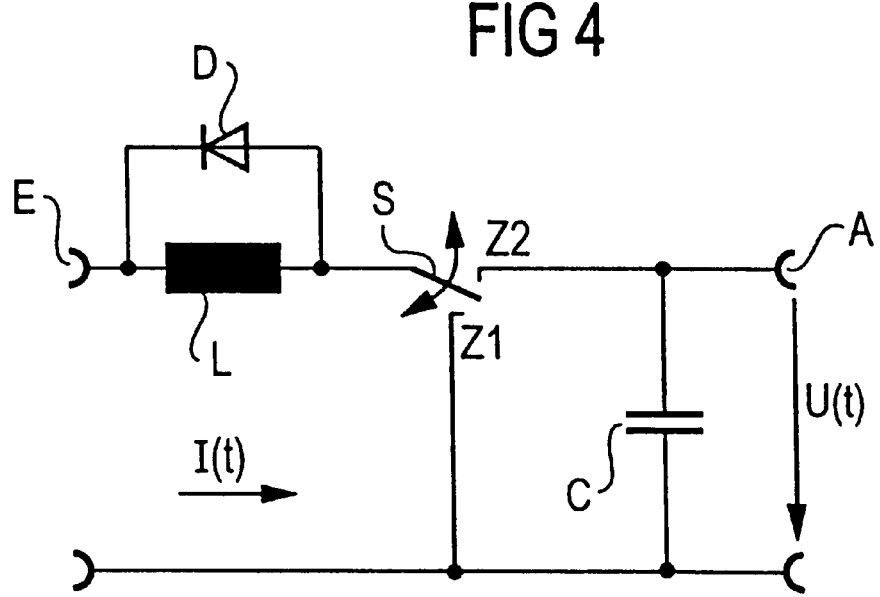
FIG. 4 is a diagram of a second exemplary embodiment.

Referring now to FIG. 4, there is shown a second exemplary embodiment. Here, the capacitance CZ as shown in FIGS. 1 to 3 is replaced by an inductance. The following situation is brought about by switching the switch S from the state Z1 to the state Z2. In the state Z1 a current I(T) is forced to flow into the inductance L, and thus forms a magnetic field. This magnetic field corresponds to magnetic energy stored in this coil. When the switch S changes from the state Z1 to the state Z2, then the coil is once again connected to the capacitor C which is once again charged by a charging current to a voltage UV(T) drawn from the magnetic energy stored in the inductance L. In order to prevent over-voltages occurring when switching from the state Z1 to the state Z2, a so-called freewheeling diode D must be provided in parallel with the inductance L. If it is not possible to integrate the inductance L on the semiconductor chip, then it can be arranged at least directly on the surface of the semiconductor chip. It will be understood that the developments and variations shown in FIGS. 2 and 3 can be transferred in a corresponding manner to the second exemplary embodiment.

We claim:

1. A power supply device, comprising:
   a power supply input and a power supply output;
   a switching device having a first switching state, a second switching state, and a third switching state temporally following the second switching state;
   a main energy store connected to said power supply output;
   a temporary energy store connected to said power supply input in the first switching state and to said main energy store in the second switching state of said switching device; and
   an energy discharge device connected to said temporary energy store in the third switching state of said switching device.

2. The power supply device according to claim 1, wherein said switching device is one of a plurality of switching devices and said temporary energy store is one of a plurality of temporary energy stores respectively associated with said switching devices and selectively connectible in parallel with one another to said power supply input and to said main energy store.

3. The power supply device according to claim 2, wherein said plurality of temporary energy stores are connected to said power supply input at different predetermined times.

4. The power supply arrangement according to claim 3, wherein said plurality of temporary energy stores are simultaneously connected to said main energy store.

5. A circuit configuration, comprising a power supply device according to claim 1, and a data processing device connected to said power supply output.

6. The circuit configuration according to claim 5, wherein said power supply device and said data processing device are integrated on a common semiconductor chip.

7. The circuit configuration according to claim 5, wherein said switching device is configured to be operated at a frequency which is less than or equal to a maximum operating frequency of said data processing device.

* * * * *